United States Patent
Maki (10) Patent No.: US 10,798,758 B2
(45) Date of Patent: Oct. 6, 2020

(54) COMMUNICATION APPARATUS AND METHOD FOR CONTROLLING THE SAME

(71) Applicant: CANON KABUSHIKI KAISHA, Tokyo (JP)

(72) Inventor: Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 15/778,069

(22) PCT Filed: Nov. 25, 2016

(86) PCT No.: PCT/JP2016/004955
§ 371 (c)(1),
(2) Date: May 22, 2018

(87) PCT Pub. No.: WO2017/090251
PCT Pub. Date: Jun. 1, 2017

(65) Prior Publication Data
US 2018/0352591 A1 Dec. 6, 2018

(30) Foreign Application Priority Data
Nov. 28, 2015 (JP) .................. 2015-232516

(51) Int. Cl.
| | | |
|---|---|---|
| *G06F 3/12* | (2006.01) | |
| *H04W 76/11* | (2018.01) | |
| *H04W 76/30* | (2018.01) | |
| *H04W 76/34* | (2018.01) | |
| *H04W 76/14* | (2018.01) | |
| *H04W 84/12* | (2009.01) | |

(Continued)

(52) U.S. Cl.
CPC ............ *H04W 76/11* (2018.02); *H04W 76/14* (2018.02); *H04W 76/30* (2018.02); *H04W 76/34* (2018.02); *G06F 3/1218* (2013.01); *G06F 3/1236* (2013.01); *H04W 76/15* (2018.02); *H04W 84/12* (2013.01); *H04W 84/20* (2013.01)

(58) Field of Classification Search
CPC ..... H04W 76/11; H04W 76/34; H04W 76/14; H04W 76/30; H04W 76/15; H04W 84/20; H04W 84/12; G06F 3/1236; G06F 3/1218
See application file for complete search history.

(56) References Cited

U.S. PATENT DOCUMENTS 9,104,355 B2 * 8/2015 Suzuki ................. G06F 3/1236
9,521,277 B1 * 12/2016 Johnson ............ H04N 1/00315
(Continued)

FOREIGN PATENT DOCUMENTS

| JP | 2014-179926 A | 9/2014 |
|---|---|---|
| JP | 2015023440 A | 2/2015 |

(Continued)

OTHER PUBLICATIONS

International Search Report and Written Opinion of the International Searching Authority for PCT/JP2016/004955, dated Feb. 2017.

*Primary Examiner* — Jay P Patel
(74) *Attorney, Agent, or Firm* — Canon U.S.A., Inc. IP Division (57) ABSTRACT

A communication apparatus automatically stops operating in a direct wireless communication mode in conjunction with a user's logging out from the communication apparatus.

15 Claims, 8 Drawing Sheets (51) Int. Cl.
*H04W 84/20* (2009.01)
*H04W 76/15* (2018.01)

(56) References Cited

U.S. PATENT DOCUMENTS

| | | | | |
|---|---|---|---|---|
| 2006/0246946 | A1* | 11/2006 | Moritomo | H04W 76/10 455/557 |
| 2011/0122835 | A1* | 5/2011 | Naito | H04W 76/14 370/329 |
| 2012/0194863 | A1* | 8/2012 | Oshima | G06F 3/1204 358/1.15 |
| 2012/0265913 | A1* | 10/2012 | Suumaki | H04W 4/08 710/303 |
| 2013/0148161 | A1* | 6/2013 | Park | G06K 15/00 358/1.15 |
| 2014/0168681 | A1* | 6/2014 | Nakamura | G06F 3/1276 358/1.13 |
| 2014/0268222 | A1 | 9/2014 | Inoue | |
| 2014/0369331 | A1* | 12/2014 | Goto | H04L 67/16 370/338 |
| 2015/0347066 | A1* | 12/2015 | Moritomo | H04W 8/005 358/1.15 |
| 2015/0359021 | A1* | 12/2015 | Tsujii | H04W 4/80 455/41.1 |
| 2016/0004489 | A1* | 1/2016 | Yamada | G06F 3/1236 358/1.15 |
| 2016/0007395 | A1* | 1/2016 | Goto | H04W 84/12 370/338 |
| 2016/0034237 | A1* | 2/2016 | Kojima | G06F 3/1205 358/1.15 |
| 2016/0059600 | A1* | 3/2016 | Watanabe | B41J 3/46 347/16 |
| 2016/0128119 | A1* | 5/2016 | Maheshwari | H04W 4/08 370/329 |
| 2016/0283180 | A1* | 9/2016 | Omori | G06F 3/1292 |
| 2017/0215113 | A1* | 7/2017 | Lee | H04W 36/14 |
| 2017/0223579 | A1* | 8/2017 | Lee | H04W 48/14 |
| 2017/0245122 | A1* | 8/2017 | Yasuda | H04L 67/104 |
| 2017/0346891 | A1* | 11/2017 | Yasuda | H04L 67/1068 |
| 2017/0359696 | A1* | 12/2017 | Yasuda | H04W 4/08 |
| 2018/0046488 | A1* | 2/2018 | Sakamoto | G06F 13/00 |
| 2018/0098208 | A1* | 4/2018 | Chaki | H04W 76/14 |

FOREIGN PATENT DOCUMENTS

| | | |
|---|---|---|
| KR | 10-2012-0055229 A | 5/2012 |
| KR | 10-1554743 B1 | 9/2015 |

\* cited by examiner

LOG IN

PLEASE PLACE YOUR IC CARD OVER CARD READER, OR ENTER YOUR USER ID AND PASSWORD AND PRESS "LOG IN".

301 — USER ID: [ ]
302 — PASSWORD: [ ]

[ LOG IN ] — 303

FIG. 3B
310

MENU

311 — [ COPY ]   [ SEND ] — 312
313 — [ DIRECT WIRELESS COMMUNICATION ]   [ SETTINGS ] — 314

[ LOG OUT ] — 315

FIG. 3C
320

DIRECT WIRELESS SETTINGS

321 — SSID SETTINGS

☑ FIXED SSID
    PLEASE ENTER SSID: [ ] — 322

☐ ONE-TIME SSID

[ REGISTER ] — 323

[ LOG OUT ]

FIG. 4

| USER NAME | USER ID | PASSWORD |
|---|---|---|
| Tanaka | Tanaka1231 | 7bt89a |
| Sato | Sato1010 | yrj47m |
| Yamada | Yamada0707 | zrh2wh |

DIRECT WIRELESS CONNECTION

WHEN YOU PRESS "START" BUTTON, OPERATION IN ACCESS POINT MODE STARTS.

501 — [ START ]

[ LOG OUT ]

DIRECT WIRELESS CONNECTION

PLEASE SELECT DISPLAYED SSID AND ENTER CONNECTION KEY. TO STOP OPERATION IN ACCESS POINT MODE, PLEASE PRESS "STOP" BUTTON.

511 —
SSID: Direct-0001
CONNECTION KEY: 123456789

512 — [ STOP ]

[ LOG OUT ]

COMMUNICATION APPARATUS AND METHOD FOR CONTROLLING THE SAME

TECHNICAL FIELD

The present invention relates to a communication apparatus and a method for controlling the same.

BACKGROUND ART

Communication apparatuses such as smartphones, portable game machines, and printers have a wireless local area network (LAN) function. In the wireless LAN function, there is known a direct wireless communication mode of directly connecting a plurality of communication apparatuses without having an access point therebetween. PTL 1 discloses a configuration where a printer and a mobile terminal are directly connected using an access point mode, which is one example of the direct wireless communication mode.

To use the direct wireless communication mode, the user needs to instruct a communication apparatus to start operating in the direct wireless communication mode. For example, the communication apparatus displays a "start button" for starting the operation in the direct wireless communication mode. When the user presses the "start button", the communication apparatus starts operating in the direct wireless communication mode. To end the use of the direct wireless communication mode, the user instructs the communication apparatus to stop operating in the direct wireless communication mode. For example, the communication apparatus displays a "stop button" for stopping the operation in the direct wireless communication mode. When the user presses the "stop button", the communication apparatus stops operating in the direct wireless communication mode.

In communication apparatuses of the related art, the operation in the direct wireless communication mode is not stopped until the user presses the "stop button" even when it can be determined that the user has ended the use of the direct wireless communication mode.

CITATION LIST

Patent Literature

PTL 1: Japanese Patent Laid-Open No. 2015-023440

SUMMARY OF INVENTION

The present invention provides a communication apparatus to which a user can log in, including: a wireless communication unit configured to include a direct wireless communication function of performing wireless communication with an external device without having a relay device therebetween; a determination unit configured to determine, in accordance with a number of wireless connections established by the direct wireless communication function, whether to stop the direct wireless communication function in response to the user's logging out from the communication apparatus; and a controller configured to control the wireless communication unit to stop the direct wireless communication function in response to determining by the determination unit to stop the direct wireless communication function.

Further features of the present invention will become apparent from the following description of exemplary embodiments with reference to the attached drawings.

DESCRIPTION OF EMBODIMENTS

Hereinafter, embodiments of the present invention will be described using the drawings. The following embodiments are not construed to limit the invention according to the appended claims, and all combinations of the features described in the embodiments are not necessarily required.

First Embodiment

Figure 1:
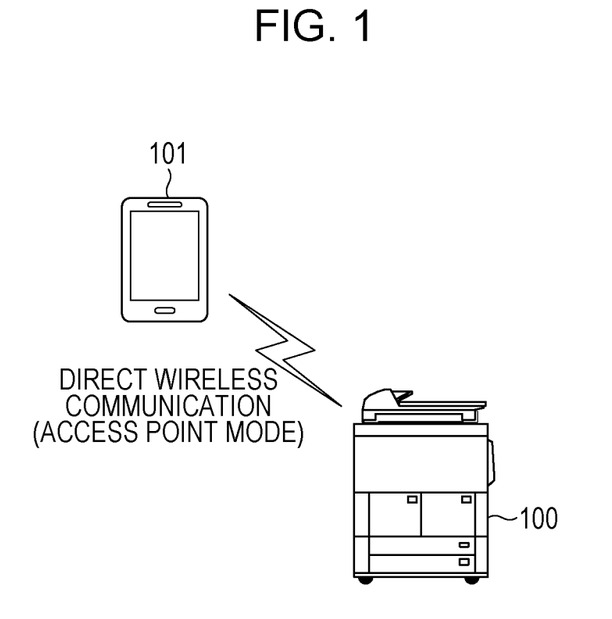
FIG. 1 is a diagram illustrating the outline of a communication system.

Referring to FIG. 1, the outline of a communication system will be described. The communication system according to a first embodiment includes a printer 100 and a mobile terminal 101.

The printer 100 has a wireless LAN function. The wireless LAN function of the printer 100 has two wireless communication modes, that is, an infrastructure mode and an access point mode. The infrastructure mode is a wireless communication mode where the printer 100 connects wirelessly to a relay device such as an access point (not illustrated) and communicates with a device such as a personal computer (PC) on a network.

In contrast, the access point mode is a wireless communication mode where a software access point is activated on the printer 100 and the printer 100 itself acts as an access point. The mobile terminal 101 such as a smartphone wirelessly connects to the printer 100 operating in the access point mode and transmits print data for printing an electronic file such as a photograph to the printer 100. With the access point mode, wireless communication can be performed directly between the printer 100 and the mobile terminal 101, without having a relay device such as an access point therebetween. Note that the access point mode is an example of a direct wireless communication mode of establishing wireless connection directly between the printer 100 and the mobile terminal 101. Instead of the access point mode, other wireless communication systems such as Wi-Fi Direct (registered trademark) may be applied to the first embodiment.

The printer 100 has a user authenticating function, which will be described in detail later. The user logs in to the printer 100 with the user authenticating function. The user who has logged in to the printer 100 can use the access point mode. When the user logs out from the printer 100, the printer 100 stops operating in the access point in conjunction with the user's logging out.

Figure 2:
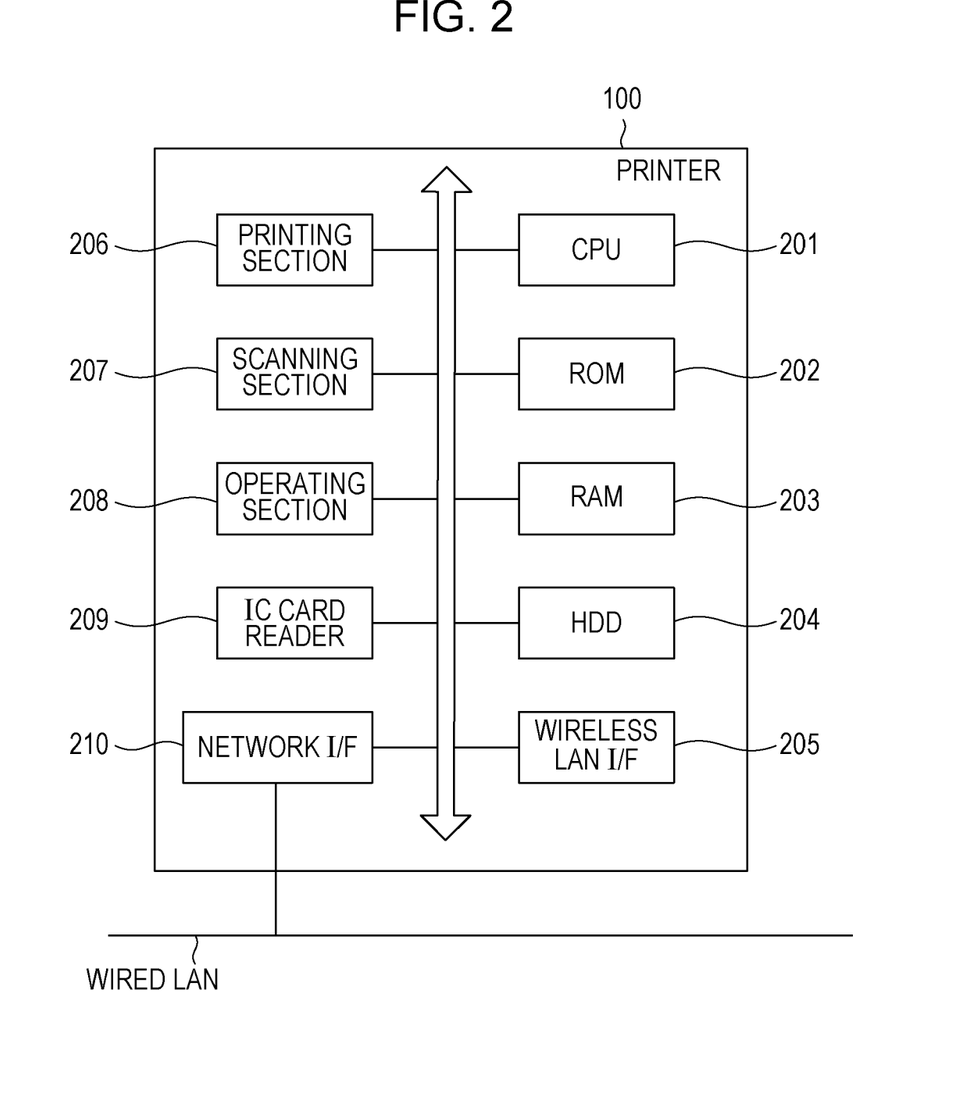
FIG. 2 is a diagram illustrating the hardware configuration of a printer.

Referring next to FIG. 2, the hardware configuration of the printer 100 will be described. A central processing unit (CPU) 201 reads a control program stored in a read-only memory (ROM) 202 and executes various processes for controlling the operation of the printer 100. The ROM 202 stores the control program. A random-access memory (RAM) 203 is used as a temporary storage area such a main memory or a work area for the CPU 201. A hard disk drive (HDD) 204 is a non-volatile storage medium for storing various types of data.

Although one CPU 201 executes processes illustrated in later-described flowcharts in the case of the printer 100, other modes are also conceivable. For example, a plurality of CPUs may cooperate to execute the processes illustrated in the later-described flowcharts. Alternatively, part or some of the processes illustrated in the later-described flowcharts may be executed using a hardware circuit such as an application-specific integrated circuit (ASIC).

A wireless LAN interface (I/F) 205 executes wireless LAN communication between the mobile terminal 101 and an external device such as an access point. Wireless LAN communication executed by the wireless LAN I/F 205 is wireless communication such as Institute of Electrical and Electronics Engineers (IEEE) 802.11 a/b/g/n/ac. The wireless LAN I/F 205 is operable in the infrastructure mode and the access point mode. The wireless LAN I/F 205 selects one of the infrastructure mode and the access point mode in accordance with device settings configured in advance by the user, and operates in the selected mode.

A network I/F 210 connects to a wired LAN via a LAN cable. The network I/F 210 is capable of communicating with an external device (such as a PC) on the wired LAN.

A printing section 206 executes printing on a sheet on the basis of print data received by the wireless LAN I/F 205 or the network I/F 210. A scanning section 207 scans a document placed by the user and generates a document image. The document image generated by the scanning section 207 is printed (so-called copied) by the printing section 206 or accumulated in the HDD 204.

An operating section 208 includes a liquid crystal display (LCD) with a touchscreen function and a keyboard, and displays various operation screens. The user can input instructions and information to the printer 100 via the operating section 208.

An integrated circuit (IC) card reader 209 reads user information from an IC card. In the case of the first embodiment, a user ID and a password are stored as user information in an IC card. The printer 100 executes user authentication on the basis of user information read by the IC card reader 209 from an IC card.

The printer 100 is given as an example of a communication apparatus operable in the access point mode. A communication apparatus to which the present invention is applicable is not limited to the printer 100. The present invention is applicable to various communication apparatuses including a digital camera, a camcorder, a smartphone, and a portable game machine as long as they are operable in the access point mode.

Next, operation screens provided by the printer 100 and operation procedures when the user uses the access point mode will be described.

Figure 3A:
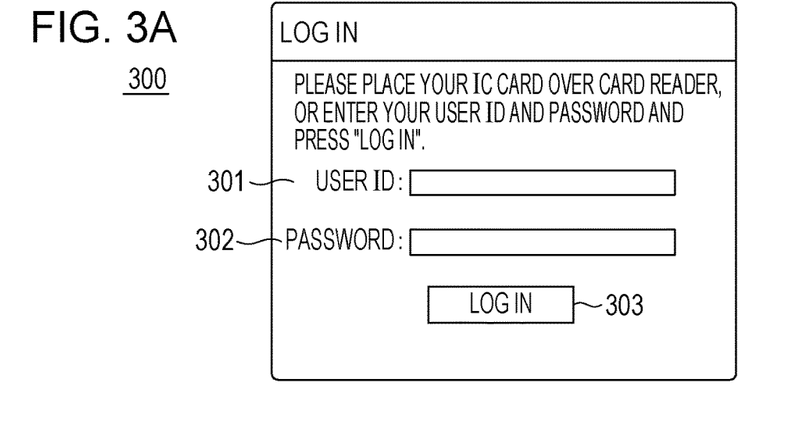
FIG. 3A is a diagram illustrating a screen displayed by the printer.

A log-in screen 300 illustrated in FIG. 3A is a screen displayed by the operating section 208 of the printer 100. When the printer 100 is completely activated, the operating section 208 initially displays the log-in screen 300. The user places his/her IC card over the IC card reader 209.

Figure 3B:
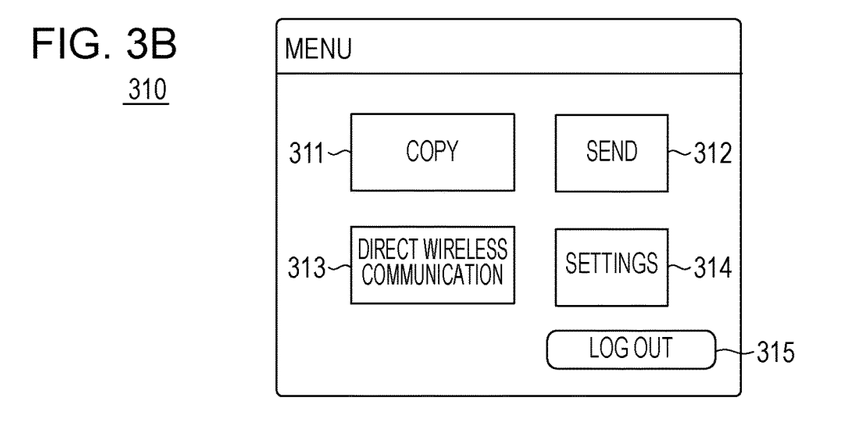
FIG. 3B is a diagram illustrating a screen displayed by the printer.
Figure 4:
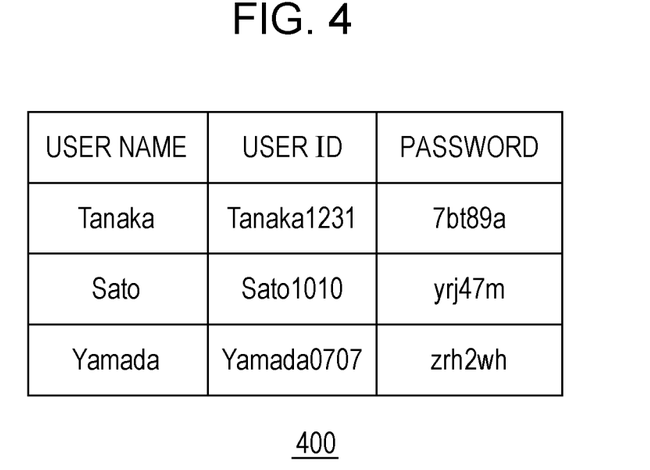
FIG. 4 is a diagram illustrating a user management table.

A user management table 400 illustrated in FIG. 4 is information for managing user information (user name, user ID, and password) on a user who is permitted to log in to the printer 100, and is stored in the HDD 204 of the printer 100. A user who is registered in the user management table 400 can log in to the printer 100. When the user places his/her IC card over the IC card reader 209, the IC card reader 209 reads user information (user ID and password) from the IC card. The CPU 201 determines whether the user information, read by the IC card reader 209 from the IC card, is registered in the user management table 400. When the user information read from the IC card is registered in the user management table 400, the user authentication is successful, and the operating section 208 displays a menu screen 310 illustrated in FIG. 3B. The state becomes such that the user who has been successfully authenticated logs in to the printer 100 and can use the printer 100. In contrast, when the user information read from the IC card is not registered in the user management table 400, the user authentication failed, and the operating section 208 informs the user of the authentication failure and does not display the menu screen 310.

In the case of the first embodiment, the user may enter his/her user ID and password in an entry field 301 and an entry field 302, without using the IC card reader 209. When the user enters his/her user ID and password in the entry field 301 and the entry field 302 and presses a log-in button 303, the printer 100 executes user authentication.

The user management table 400 may be included not in the printer 100, but in an external authentication server. When the authentication server includes the user management table 400, the printer 100 transmits the user information to the authentication server. By receiving the result of the authentication (whether the authentication is successful or failed) from the authentication server, the printer 100 executes user authentication.

The menu screen 310 illustrated in FIG. 3B displays buttons for the user to use functions provided by the printer 100. A log-out button 315 is a button for the user to log out from the printer 100. When the user presses the log-out button 315, the user who is currently logged in logs out from the printer 100. A log-out button is displayed on screens described hereinafter, and the user can input a log-out instruction when the operating section 208 displays any of these screens.

A button 311 is a button for the user to use a copy function. When the user presses the button 311, the operating section 208 displays a copy screen (not illustrated).

A button 312 is a button for the user to use a send function (function of transmitting a document image generated by the scanning section 207 to an external device). When the user presses the button 312, the operating section 208 displays a send screen (not illustrated).

Figure 3C:
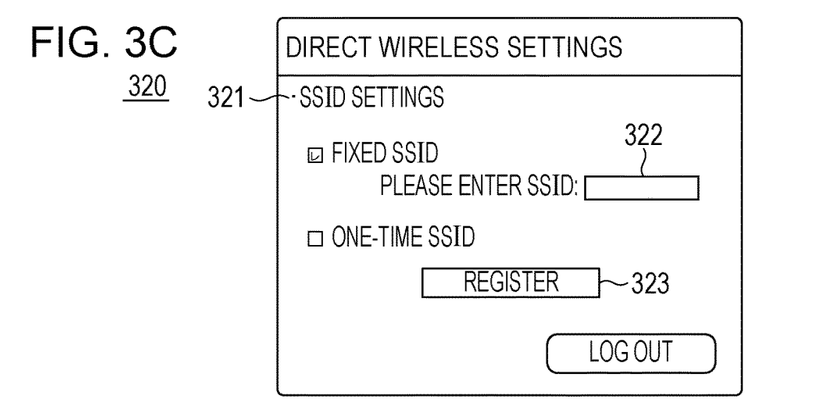
FIG. 3C is a diagram illustrating a screen displayed by the printer.

A button 314 is a button for the user to configure device settings of the printer 100. When the user presses the button 314, the operating section 208 displays various setting screens in accordance with the user operation. A setting screen 320 illustrated in FIG. 3C is one of the operation screens provided by the printer 100 to the user, and is displayed by the operating section 208. Items that can be set on the setting screen 320 will be described in detail. The setting screen 320 is a screen accessible to a user who has special privileges, such as a system administrator.

An item 321 is for setting which of a fixed service set identifier (SSID) and a one-time SSID is to be used as an SSID used in the access point mode. A fixed SSID is a setting that indicates that the same SSID is used whenever the printer 100 operates in the access point mode. The system administrator enters a desired SSID in an entry field 322. When operating in the access point mode, the printer 100 uses the SSID entered in the entry field 322 as a fixed SSID. In contrast, a one-time SSID is a setting that indicates that a random SSID is generated and that random SSID is used.

A register button 323 is a button for reflecting the settings configured on the setting screen 320 in the printer 100. When the system administrator presses the register button 323, the results of the settings configured on the setting screen 320 are stored in the HDD 204, and the settings configured on the setting screen 320 are reflected in the printer 100.

The description now returns to the menu screen 310. A button 313 is a button for the user to use the access point mode. To use the access point mode, the user first presses the button 313. When the user presses the button 313, the operating section 208 displays a wireless connection screen 500 illustrated in FIG. 5A.

Figure 5A:
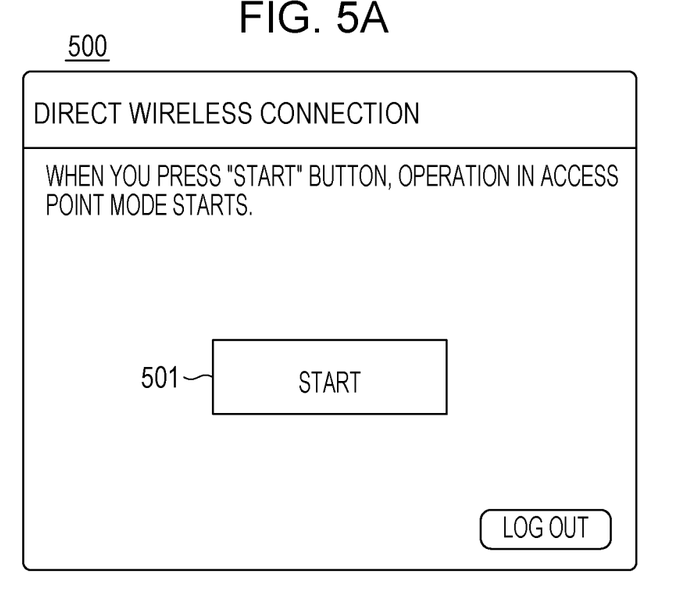
FIG. 5A is a diagram illustrating a wireless connection screen.

The wireless connection screen 500 displays a start button 501. The start button 501 is a button for the user to instruct the printer 100 to start operating in the access point mode. When the operating section 208 is displaying the wireless connection screen 500, the printer 100 has not started operating in the access point mode. Thus, even when the mobile terminal 101 searches for surrounding access points, the mobile terminal 101 cannot find the printer 100, and no wireless connection can be established between the mobile terminal 101 and the printer 100. To establish wireless connection between the mobile terminal 101 and the printer 100, the user needs to instruct the printer 100 to start operating in the access point mode. When the user presses the start button 501, the printer 100 starts operating in the access point mode. The operating section 208 displays a wireless connection screen 510 illustrated in FIG. 5B.

Figure 5B:
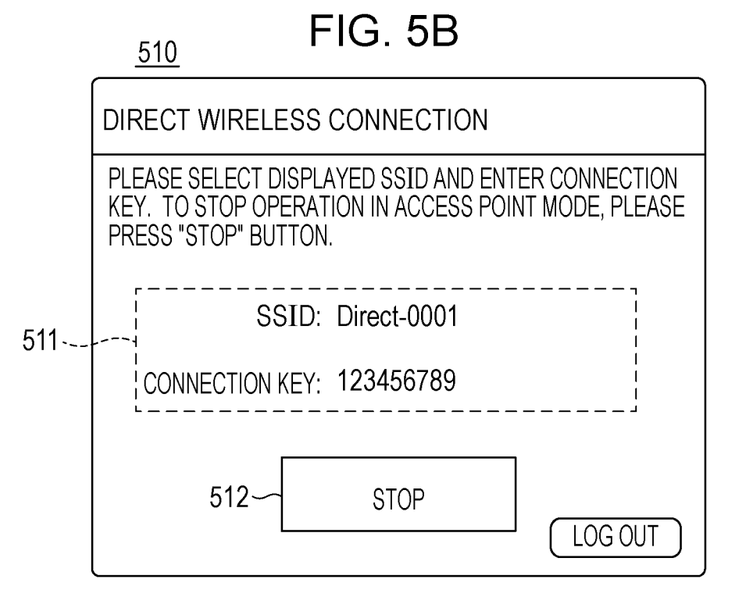
FIG. 5B is a diagram illustrating a wireless connection screen.

When the printer 100 starts operating in the access point mode, the printer 100 generates an SSID and a connection key (such as a Wired Equivalent Privacy (WEP) key). A field 511 of the wireless connection screen 510 displays the SSID and connection key generated by the printer 100. When it has been set on the setting screen 320 to use a fixed SSID, a fixed SSID is generated and displayed in the field 511. In contrast, when it has been set on the setting screen 320 to use a one-time SSID, a random SSID is generated and displayed in the field 511.

The user who has checked the details displayed in the field 511 uses his/her mobile terminal 101 to search for surrounding access points, and selects an access point with the SSID displayed in the field 511 from the search result list. When the user enters the connection key displayed in the field 511 to the mobile terminal 101, wireless connection based on the access point mode is established between the printer 100 and the mobile terminal 101. After wirelessly connecting the mobile terminal 101 to the printer 100 using the access point mode, the user selects on the mobile terminal 101 a photograph that the user wants to print. When the user inputs a print instruction to the mobile terminal 101, the mobile terminal 101 uses wireless communication in the access point mode to transmit print data for printing the photograph selected by the user to the printer 100. On receipt of the print data, the printer 100 executes printing based on the received print data on a sheet.

When the printer 100 starts operating in the access point mode, the printer 100 enters a standby state for receiving a request for establishing wireless connection from an external device such as the mobile terminal 101. When the printer 100 starts operating in the access point mode, the mobile terminal 101 can find the printer 100 when searching for surrounding access points. On receipt of a request from an external device for establishing wireless communication, the printer 100 establishes wireless connection in the access point mode with the external device. After establishing the wireless connection, actual data communication (such as transmission of print data from the mobile terminal 101 to the printer 100) is executed between the printer 100 and the external device.

The wireless connection screen 510 displays a stop button 512. The stop button 512 is for receiving from the user a stop instruction for stopping the operation in the access point mode. To stop the operation of the printer 100 in the access point mode, the user presses the stop button 512. When the user presses the stop button 512, the printer 100 stops operating in the access point mode. The printer 100 also stops operating in the access point mode when the user logs out from the printer 100.

Figure 6:
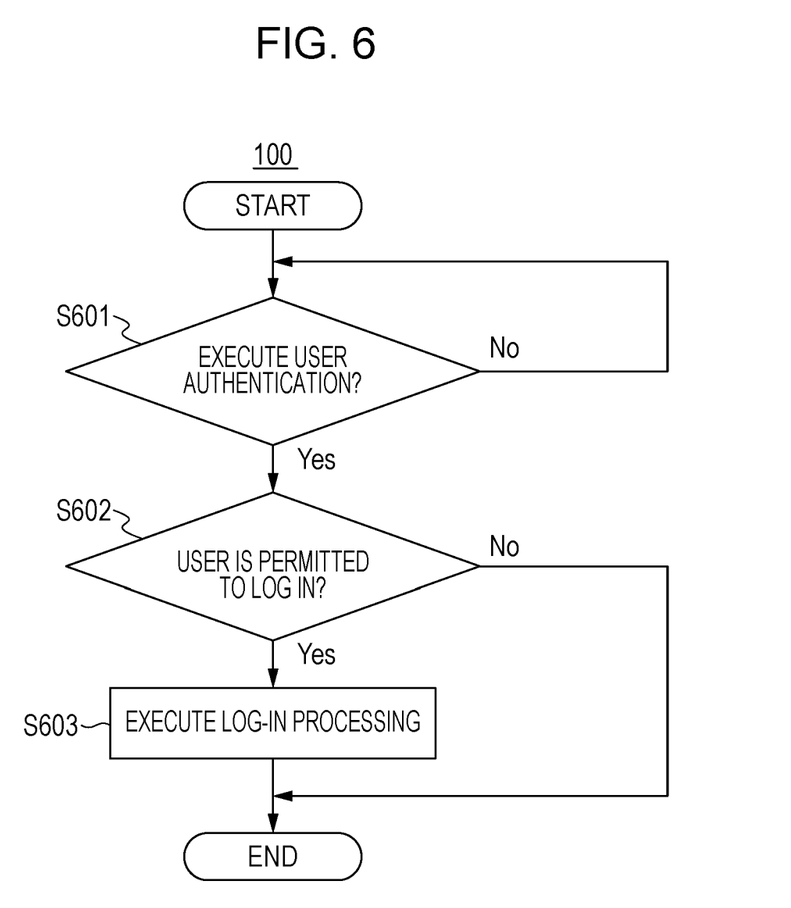
FIG. 6 is a flowchart illustrating a process regarding user authentication.

Next, a process executed by the printer 100 when the user logs in to the printer 100 will be described using a flowchart illustrated in FIG. 6. Each step illustrated in the flowchart in FIG. 6 is processed when the CPU 201 expands and executes a control program stored in a memory such as the ROM 202 or the like in the RAM 203. Alternatively, the printer 100 may be configured such that at least some of the steps of the flowchart illustrated in FIG. 6 are executed by the CPU 201, and the remaining steps are executed by a CPU (not illustrated) different from the CPU 201.

At first, in step S601, the CPU 201 determines whether to execute user authentication. When the IC card reader 209 reads user information from an IC card, or when the user enters his/her user ID and password in the entry field 301 and the entry field 302 and presses the log-in button 303, the CPU 201 determines to execute user authentication. The process proceeds to step S602.

Next in step S602, the CPU 201 determines whether a user indicated by the user information is a user who is permitted to log in. This determination is done by checking whether the user information is registered in the user management table 400. When the user information is registered in the user management table 400 (the user authentication is successful), the process proceeds to step S603. In step S603, the CPU 201 executes log-in processing. The CPU 201 lets the user who has been successfully authenticated log in to the printer 100, and controls the operating section 208 to display the menu screen 310.

In contrast, when the user information is not registered in the user management table 400 (the user authentication failed), it is determined in step S602 that the user indicated by the user information is a user who is not permitted to log in. The CPU 201 informs the user of the authentication failure, and ends the process, without executing log-in processing.

Figure 7:
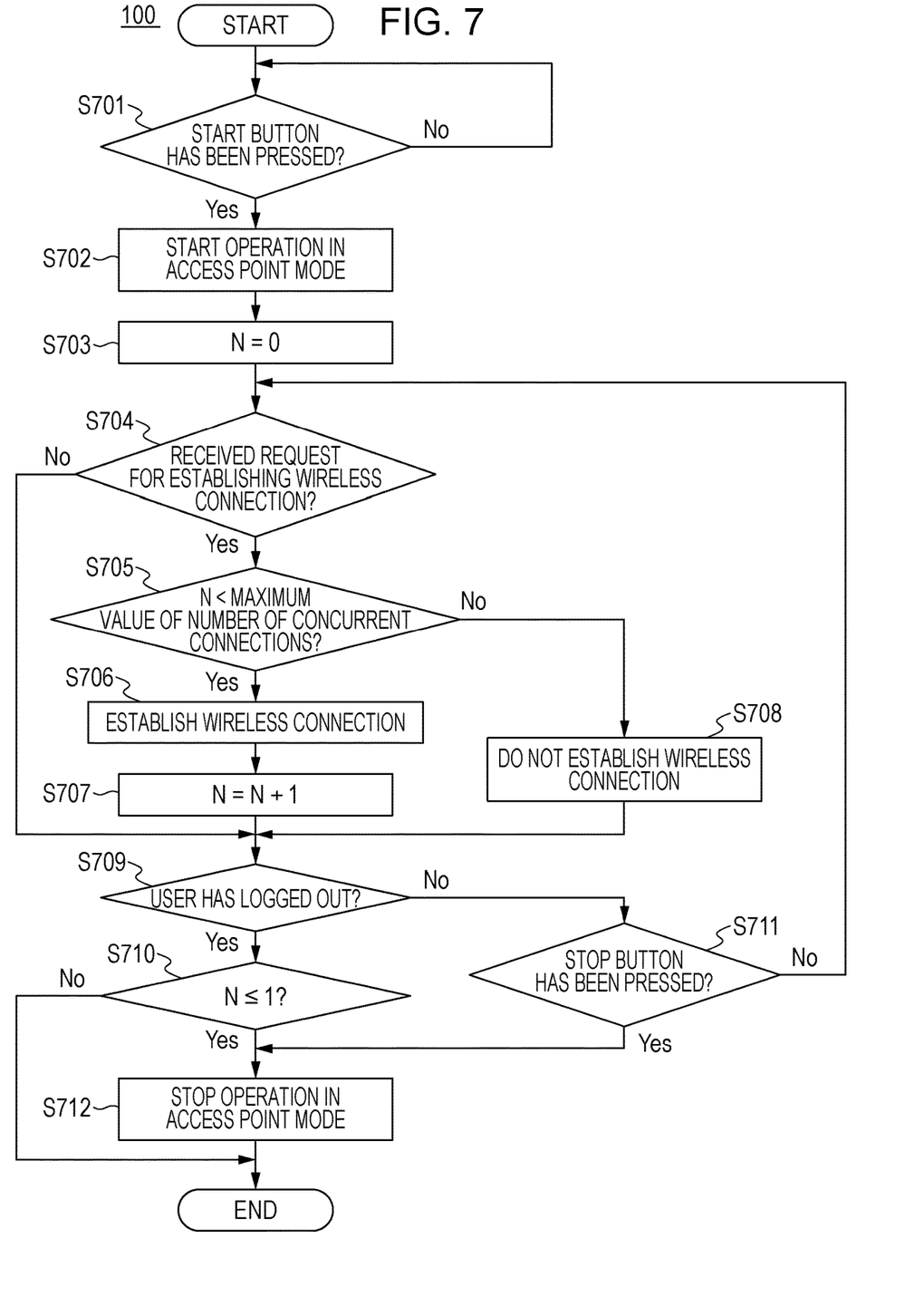
FIG. 7 is a flowchart illustrating a process regarding operation in an access point mode.

Next, a process executed by the printer 100 when the user uses the access point mode and the printer 100 automatically stops operating in conjunction with the user's logging out will be described using a flowchart illustrated in FIG. 7. Each step illustrated in the flowchart in FIG. 7 is processed when the CPU 201 expands and executes a control program stored in a memory such as the ROM 202 or the like in the RAM 203. Alternatively, the printer 100 may be configured such that at least some of the steps of the flowchart illustrated in FIG. 7 are executed by the CPU 201, and the remaining steps are executed by a CPU (not illustrated) different from the CPU 201.

In step S701, the CPU 201 determines whether the user has pressed the start button 501. When the CPU 201 detects that the user has pressed the start button 501, the process proceeds to step S702. In step S702, the CPU 201 controls the wireless LAN I/F 205 to start the operation in the access point mode. The wireless LAN I/F 205 generates a fixed SSID or a one-time SSID in accordance with the results of the settings configured on the setting screen 320, and starts the operation in the access point mode.

Next in step S703, the CPU 201 sets zero as the value of a variable N. The variable N is a variable for managing the number of devices with which wireless connection in the access mode has been established by the printer 100. In the case of the first embodiment, the printer 100 can simultaneously establish wireless connection in the access point mode with up to five devices. The value five is only one example of the maximum value of the number of concurrent connections, and the value may be another value. Although the first embodiment describes that the maximum value of the number of concurrent connections remains unchanged even when either of a fixed SSID and a one-time SSID is used, the maximum value of the number of concurrent connections may be made different between the case of using a fixed SSID and the case of using a one-time SSID.

Next in step S704, the CPU 201 determines whether a request from an external device for establishing wireless connection has been received. When the wireless LAN I/F 205 receives a request from an external device for establishing wireless connection, the process proceeds to step S705. In contrast, when the wireless LAN I/F 205 does not receive a request from an external device for establishing wireless connection, the process proceeds to step S709.

Next, step S705 will be described. In step S705, the CPU 201 determines whether the value of the variable N is less than the maximum value of the number of concurrent connections. When the value of the variable N, that is, the number of devices with which wireless connection in the access point mode has been established at present, is less than the maximum value of the number of concurrent connections, the process proceeds to step S706. In step S706, the CPU 201 controls the wireless LAN I/F 205 to establish wireless connection with the device, which has sent the request for establishing wireless connection. The wireless LAN I/F 205 establishes wireless connection in the access point mode with the device, which has sent the request for establishing wireless connection. In step S707, the CPU 201 increments the value of the variable N by one. In contrast, when the value of the variable N, that is, the number of devices with which wireless connection in the access point mode has been established at present, is equal to the maximum value of the number of concurrent connections, the process proceeds to step S708. In step S708, the CPU 201 rejects the request for establishing wireless connection. The device, which has sent the request for establishing wireless connection, fails to establish wireless connection in the access point mode with the printer 100.

Next, step S709 will be described. In step S709, the CPU 201 determines whether the user who is currently logged in to the printer 100 has logged out from the printer 100. In the case of the first embodiment, the user logs out when the user presses the log-out button or when a certain period of time (such as five minutes) elapses without any user operation. When the user who is currently logged in logs out from the printer 100, the process proceeds to step S710. In contrast, when it is determined in step S709 that the user who is currently logged in has not logged out from the printer 100, the process proceeds to step S711.

Next, step S710 will be described. In step S710, the CPU 201 determines whether the value of the variable N is less than or equal to one. When the value of the variable N, that is, the number of devices with which wireless connection in the access point mode has been established at present, is less than or equal to one, the process proceeds to step S712. In step S712, the CPU 201 controls the wireless LAN I/F 205 to stop the operation in the access point mode. Under control of the CPU 201, the wireless LAN I/F 205 stops the operation in the access point mode. In contrast, when the value of the variable N, that is, the number of devices with which wireless connection in the access point mode has been established at present, is greater than or equal to two, the CPU 201 ends the process illustrated in the flowchart, without having the wireless LAN I/F 205 stop the operation in the access point mode. The printer 100 is characterized in that the printer 100 determines whether to stop operating in the access point mode in conjunction with the user's logging out, on the basis of the number of wireless connections established in the access point mode.

When the value of the variable N, that is, the number of devices with which wireless connection in the access point mode has been established at present, is zero, it is determined "Yes" in step S710, and the wireless LAN I/F 205 stops the operation in the access point mode. The fact that the value of the variable N is zero can be determined that there is no user who uses the access point mode. Thus, when the value of the variable N is zero, the wireless LAN I/F 205 stops the operation in the access point mode in conjunction with the user's logging out.

When the value of the variable N, that is, the number of devices with which wireless connection in the access point mode has been established at present, is one, it is determined "Yes" in step S710, and the wireless LAN I/F 205 stops the operation in the access point mode. The fact that the value of the variable N is one can be determined that it is highly likely that only the user who is currently logged uses the access point mode, and no other users use the access point mode. Thus, when the value of the variable N is one, the wireless LAN I/F 205 stops the operation in the access point mode in conjunction with the user's logging out.

When the value of the variable N, that is, the number of devices with which wireless connection in the access point mode has been established at present, is two or greater (plural), it is determined "No" in step S710, and the wireless LAN I/F 205 does not stop the operation in the access point mode. When the value of the variable N is plural, it can be determined that it is highly likely that, besides the user who is currently logged in, other users also use the access point mode. If the operation in the access point mode is stopped in this state in conjunction with the user's logging out, it becomes impossible for the other users to use the access point mode. Thus, when the value of the variable N is plural, the wireless LAN I/F 205 does not stop the operation in the access point mode even when the user logs out.

Next, step S711 will be described. In step S711, the CPU 201 determines whether the user has pressed the stop button 512. When the CPU 201 detects that the user has pressed the stop button 512, the process proceeds to step S712. In step S712, the CPU 201 controls the wireless LAN I/F 205 to stop the operation in the access point mode, and the wireless LAN I/F 205 stops the operation in the access point mode. In contrast, when the CPU 201 determines in step S711 that the user has not pressed the stop button 512, the process proceeds to step S704.

As has been described above, according to the first embodiment, the printer 100 can stop operating in the access point in conjunction with the user's logging out from the printer 100. In the case of the printer 100, the wireless LAN I/F 205 operates in one of the infrastructure mode and the access point mode, and is incapable of simultaneously operating in both the infrastructure mode and the access point mode. Thus, when the wireless LAN I/F 205 is operating in the access point mode, the wireless LAN I/F 205 can neither operate in the infrastructure mode nor receive print data from a PC via an external access point mode. Therefore, in the first embodiment, the wireless LAN I/F 205 automatically stops the operation in the access point mode in conjunction with the user's logging out. By automatically stopping the operation in the access point mode in conjunction with the user's logging out, the operation mode of the wireless LAN I/F 205 can be switched from the access point mode to the infrastructure mode.

Second Embodiment

A second embodiment will be described. In the second embodiment, a process of switching, on the basis of the type of SSID used in the access point mode, whether to stop the operation in the access point mode in conjunction with the user's logging out will be described. The configuration of the printer 100 is the same as that in the first embodiment.

On the setting screen 320, the printer 100 sets one of a fixed SSID and a one-time SSID as an SSID used in the access point mode. In the second embodiment, the maximum value of the number of concurrent connections in the case of using a fixed SSID is plural (such as five), and the maximum value of the number of concurrent connections in the case of using a one-time SSID is one. In the case of the settings indicating the use of a one-time SSID, it is characterized that the wireless LAN I/F 205 stops the operation in the access point mode in conjunction with the user's logging out. In contrast, in the case of the settings indicating the use of a fixed SSID, the wireless LAN I/F 205 does not stop the operation in the access point mode even when the user logs out.

Figure 8:
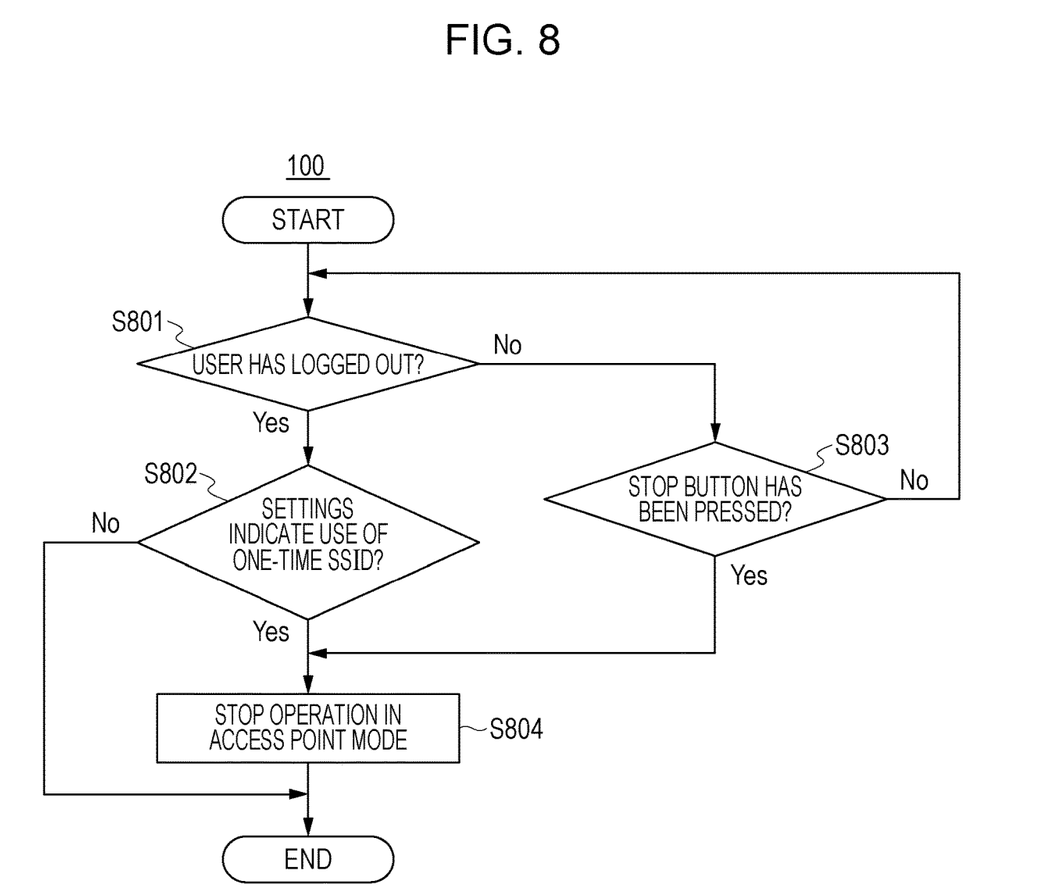
FIG. 8 is a flowchart illustrating a process regarding operation in the access point mode.

This process will be described using a flowchart illustrated in FIG. 8. Each step illustrated in the flowchart in FIG. 8 is processed when the CPU 201 expands and executes a control program stored in a memory such as the ROM 202 or the like in the RAM 203. Alternatively, the printer 100 may be configured such that at least some of the steps of the flowchart illustrated in FIG. 8 are executed by the CPU 201, and the remaining steps are executed by a CPU (not illustrated) different from the CPU 201.

In step S801, the CPU 201 determines whether the user who is currently logged in to the printer 100 has logged out from the printer 100. In the case of the second embodiment, the user logs out when the user presses the log-out button or when a certain period of time (such as five minutes) elapses without any user operation. When the user who is currently logged in logs out from the printer 100, the process proceeds to step S802. In contrast, when it is determined in step S801 that the user who is currently logged in has not logged out from the printer 100, the process proceeds to step S803. In step S803, the CPU 201 determines whether the user has pressed the stop button 512. When the CPU 201 detects that the user has pressed the stop button 512, the process proceeds to step S804.

Step S802 will be described. In step S802, the CPU 201 determines whether the settings regarding the access point mode, which are configured on the printer 100, indicate the use of a one-time SSID. This determination is executed by checking the results of the settings configured on the setting screen 320. When the settings regarding the access point mode indicate the use of a one-time SSID, the process proceeds to step S804. In step S804, the CPU 201 controls the wireless LAN I/F 205 to stop the operation in the access point mode. Under control of the CPU 201, the wireless LAN I/F 205 stops the operation in the access point mode. In contrast, when the settings regarding the access point mode indicate the use of a fixed SSID, the CPU 201 ends the process illustrated in the flowchart, without having the wireless LAN I/F 205 stop the operation in the access point mode.

When the settings regarding the access point mode indicate the use of a one-time SSID, it is determined "Yes" in step S802, and the wireless LAN I/F 205 stops the operation in the access point mode. When the settings regarding the access point mode indicate the use of a one-time SSID, the maximum value of the number of concurrent wireless connections in the access point mode is one. The fact that the maximum value of the number of concurrent connections is one can be determined that the use of the access point mode ends when the user logs out, since it is assumed that the access point mode is used only by the user who is currently logged in. Thus, when the settings regarding the access point mode indicate the use of a one-time SSID, the wireless LAN I/F 205 stops the operation in the access point mode in conjunction with the user's logging out.

When the settings regarding the access point mode indicate the use of a fixed SSID, it is determined "No" in step S802, and the wireless LAN I/F 205 does not stop the operation in the access point mode. When the settings regarding the access point mode indicate the use of a fixed SSID, the maximum value of the number of concurrent wireless connections in the access point mode is plural (such as five). The fact that the maximum value of the number of concurrent connections is plural can be determined that it is preferable that the printer 100 not stop operating in the access point mode since it is assumed that the access point mode is used by a plurality of users with their desired timings. When the settings regarding the access point mode indicate the use of a fixed SSID, the wireless LAN I/F 205 does not stop the operation in the access point mode and continues the operation in the access point mode even when the user logs out from the printer 100.

As has been described above, the printer 100 is characterized in that the printer 100 determines whether to stop operating in the access point mode in conjunction with the user's logging out, on the basis of the type of SSID used in the access point mode. When an SSID used in the access point mode is a one-time SSID, the printer 100 stops operating in the access point mode in conjunction with the user's logging out. In contrast, when an SSID used in the access point mode is a fixed SSID, the printer 100 does not stop operating in the access point mode even when the user logs out.

Although the second embodiment has given a one-time SSID as an example of an SSID where the maximum value of the number of concurrent connections is one, the present application is applicable to, instead of a one-time SSID, any other type of SSID as long as the maximum value of the number of concurrent connections is one. As another type of SSID, for example, the setting indicating that an SSID corresponding to a user is generated and that SSID is used in the access point mode is conceivable. In the case of using an SSID corresponding to a user, the printer 100 switches the to-be-used SSID in accordance with a user who is currently logged in. For example, when a user A is currently logged in, the printer 100 uses a user SSID for the user A; and, when a user B is currently logged in, the printer 100 uses a user SSID for the user B. It is preferable that the maximum value of the number of concurrent connections be one even in such a case where an SSID corresponding to a user is used in the access point mode, and it is also preferable that the printer 100 stop operating in the access point mode in conjunction with the user's logging out.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232516, filed Nov. 28, 2015, which is hereby incorporated by reference herein in its entirety.

The invention claimed is:

1. A communication apparatus to which a user can log in, comprising:
   a wireless communication interface having a direct wireless communication function of performing wireless communication with an external device without using an external relay device therebetween;
   a display device;
   at least one memory that stores a set of instructions; and
   at least one processor that executes the instructions, the instructions, when executed, causing the communication apparatus to perform operations comprising:
   displaying an operation screen for allowing a user having logged in to use a function of the communication apparatus on the display device of the communication apparatus in a case where the user has logged in to the communication apparatus, wherein a login waiting screen is displayed on the display device while the user has not logged in to the communication apparatus;
   determining, based on a number of wireless connections established by the direct wireless communication function, whether to stop the direct wireless communication function in response to the user's logging out from the communication apparatus; and
   controlling the wireless communication interface to stop the direct wireless communication function in response to determining to stop the direct wireless communication function,
   wherein if it is determined, in the determining, that the number of wireless connections is zero, the direct wireless communication function is stopped.

2. The communication apparatus according to claim 1, wherein the communication apparatus is a printer.

3. The communication apparatus according to claim 1, wherein the direct wireless communication function is a function for the communication apparatus to act as an access point, and the communication apparatus stops acting as the access point in a case where the direct wireless communication function is stopped.

4. The communication apparatus according to claim 1, wherein the direct wireless communication function is a function for the communication apparatus to perform wireless communication compliant with Wi-Fi Direct® with an external device.

5. A communication apparatus to which a user can log in, comprising:
   a wireless communication interface having a direct wireless communication function of performing wireless communication with an external device without using an external relay device therebetween;
   a display device;
   at least one memory that stores a set of instructions; and
   at least one processor that executes the instructions, the instructions, when executed, causing the communication apparatus to perform operations comprising:
   displaying an operation screen for allowing a user having logged in to use a function of the communication apparatus on the display device of the communication apparatus in a case where the user has logged in to the communication apparatus, wherein a login waiting screen is displayed on the display device while the user has not logged in to the communication apparatus;
   determining, based on a number of wireless connections established by the direct wireless communication function, whether to stop the direct wireless communication function in response to the user's logging out from the communication apparatus; and
   controlling the wireless communication interface to stop the direct wireless communication function in response to determining to stop the direct wireless communication function,
   wherein if it is determined, in the determining, that the number of wireless connections is zero or one, the direct wireless communication function is stopped.

6. A communication apparatus to which a user can log in, comprising:

a wireless communication interface having a direct wireless communication function of performing wireless communication with an external device without using an external relay device therebetween;
at least one memory that stores a set of instructions; and
at least one processor that executes the instructions, the instructions, when executed, causing the communication apparatus to perform operations comprising:
controlling the wireless communication interface to stop the direct wireless communication function in accordance with the user's logging out from the communication apparatus in a case where a certain type of a service set identifier (SSID) is set on the communication apparatus as a type of SSID to be used in the direct wireless communication function,
wherein the direct wireless communication function is not stopped in response to the user's logging out from the communication apparatus in a case where a second type of a service set identifier (SSID) different from the certain type is set on the communication apparatus as the type of SSID to be used in the direct wireless communication function.

7. The communication apparatus according to claim 6, wherein the certain type is a type using a randomly-generated SSID, and
wherein, in a case where the randomly-generated SSID is set on the communication apparatus as the type of SSID to be used, one is set as the upper limit of the number of external devices.

8. The communication apparatus according to claim 6, further comprising:
a printing device,
wherein the operations further include: receiving a first user operation for changing the type of SSID to be used in the direct wireless communication set on the communication apparatus.

9. The communication apparatus according to claim 6, wherein the direct wireless communication function is a function for the communication apparatus to act as an access point, and the communication apparatus stops acting as the access point in a case where the direct wireless communication function is stopped.

10. The communication apparatus according to claim 6, wherein the direct wireless communication function is a function for the communication apparatus to perform wireless communication compliant with Wi-Fi Direct® with an external device.

11. The communication apparatus according to claim 6, wherein the operations further include: receiving a second user operation for stopping the direct wireless communication, and, in a case where the second user operation is received, the direct wireless communication function is stopped regardless of the type of SSID.

12. A method for controlling a communication apparatus to which a user can log in, the communication apparatus including a direct wireless communication function of performing wireless communication with an external device without using an external relay device therebetween, comprising:
displaying an operation screen for allowing a user having logged in to use a function of the communication apparatus on a display device of the communication apparatus in a case where the user has logged in to the communication apparatus, wherein a login waiting screen is displayed on the display device while the user has not logged in to the communication apparatus;
determining, based on a number of wireless connections established by the direct wireless communication function, whether to stop the direct wireless communication function in response to the user's logging out from the communication apparatus; and
controlling the communication apparatus to stop the direct wireless communication function in response to determining to stop the direct wireless communication function,
wherein if it is determined, in the determining, that the number of wireless connections is zero, the direct wireless communication function is stopped.

13. A method for controlling a communication apparatus to which a user can log in, the communication apparatus having a direct wireless communication function of performing wireless communication with an external device without using an external relay device therebetween, comprising:
controlling the communication apparatus to stop the direct wireless communication function in accordance with the user's logging out from the communication apparatus in a case where a certain type of a service set identifier (SSID) is set on the communication apparatus as the type of SSID to be used in the direct wireless communication function,
wherein the direct wireless communication function is not stopped in response to the user's logging out from the communication apparatus in a case where a second type of a service set identifier (SSID) different from the certain type is set on the communication apparatus as the type of SSID to be used in the direct wireless communication function.

14. One or more non-transitory computer-readable media storing instructions that, when executed by one or more computing devices, cause the one or more computing devices to perform operations comprising:
displaying an operation screen, for allowing a user having logged in to a communication apparatus to use a function of the communication apparatus, on a display device of the communication apparatus in a case where the user has logged in to the communication apparatus, wherein a login waiting screen is displayed on the display device while the user has not logged in to the communication apparatus, and wherein the communication apparatus includes a direct wireless communication function of performing wireless communication with an external device without using an external relay device therebetween;
determining, based on a number of wireless connections established by the direct wireless communication function, whether to stop the direct wireless communication function in response to the user's logging out from the communication apparatus; and
controlling the wireless communication interface to stop the direct wireless communication function in response to determining to stop the direct wireless communication function,
wherein if it is determined, in the determining, that the number of wireless connections is zero, the direct wireless communication function is stopped.

15. One or more non-transitory computer-readable media storing instructions that, when executed by one or more computing devices, cause the one or more computing devices to perform operations comprising:
controlling a wireless communication interface of a communication apparatus to stop a direct wireless communication function in accordance with a user's logging out from the communication apparatus in a case where a certain type of a service set identifier (SSID) is set on the communication apparatus as a type of SSID to be used in the direct wireless communication function, wherein the communication apparatus includes the direct wireless communication function of performing wireless communication with an external device without using an external relay device therebetween, wherein the direct wireless communication function is not stopped in response to the user's logging out from the communication apparatus in a case where a second type of a service set identifier (SSID) different from the certain type is set on the communication apparatus as the type of SSID to be used in the direct wireless communication function.

* * * * *